(12) United States Patent
Bank et al.

(10) Patent No.: US 8,539,363 B2
(45) Date of Patent: *Sep. 17, 2013

(54) USER-CONFIGURED MANAGEMENT OF IM AVAILABILITY STATUS

(75) Inventors: Judith H. Bank, Morrisville, NC (US);
Lisa M. W. Bradley, Cary, NC (US);
Thomas R. Haynes, Apex, NC (US);
Lin Sun, Morrisville, NC (US);
Chunhui Yang, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 25 days.

This patent is subject to a terminal disclaimer.

(21) Appl. No.: 13/285,283

(22) Filed: Oct. 31, 2011

(65) Prior Publication Data
US 2012/0117489 A1    May 10, 2012

Related U.S. Application Data

(63) Continuation of application No. 11/924,717, filed on Oct. 26, 2007, now Pat. No. 8,103,958.

(51) Int. Cl.
*G06F 3/048* (2013.01)
*G06F 15/16* (2006.01)

(52) U.S. Cl.
USPC ........... 715/753; 715/751; 715/758; 715/733; 709/204

(58) Field of Classification Search
USPC ................. 715/733, 751, 753, 758, 835, 846, 715/847; 709/204, 207
See application file for complete search history.

(56) References Cited

U.S. PATENT DOCUMENTS

| | | |
|---|---|---|
| 7,292,870 B2 | 11/2007 | Heredia et al. |
| 7,552,177 B2 | 6/2009 | Kessen et al. |
| 7,949,952 B2 | 5/2011 | Hawley et al. |
| 2002/0087649 A1 | 7/2002 | Horvitz |
| 2003/0065721 A1 | 4/2003 | Roskind |
| 2008/0022097 A1 | 1/2008 | Gillum et al. |
| 2008/0216022 A1 | 9/2008 | Lorch et al. |

OTHER PUBLICATIONS

"U.S. Appl. No. 11/924,717 Office Action", Aug. 20, 2010, 12 pages.
"U.S. Appl. No. 11/924,717 Office Action", Jan. 3, 2011, 14 pages.

*Primary Examiner* — Xiomar L Bautista
(74) *Attorney, Agent, or Firm* — DeLizio Gilliam, PLLC

(57) ABSTRACT

A method includes associating a user-defined shortcut command with at least two different user-drafted status responses. In response to a user receiving a first instant message from a first sender at an inopportune time and the user then inputting the user-defined shortcut command, the method includes automatically transmitting a first user-draft status response to the first sender of the first instant message that was received at the inopportune time. In response to the user receiving a second message from a second sender at the inopportune time and the user then inputting the user-defined shortcut command, the method includes automatically transmitting a second user-draft status response to the second sender of the instant message that was received at the inopportune time. A relationship between the first sender and the user is different than a relationship between the second sender and the user.

25 Claims, 6 Drawing Sheets

USER-CONFIGURED MANAGEMENT OF IM AVAILABILITY STATUS

CROSS-REFERENCE TO RELATED APPLICATION

This application is a continuation of U.S. patent application Ser. No. 11/924,717, entitled USER-CONFIGURED MANAGEMENT OF IM AVAILABILITY STATUS, filed Oct. 26, 2007, now allowed.

BACKGROUND

The present disclosure relates to the field of computers, and specifically to software. Still more specifically, the present disclosure relates to Instant Messaging (IM) sessions.

Instant Messaging (IM) is real-time communication between two or more computer users. Typically, the real-time communication is in the form of text that is typed into a computer by one user, and which is then received seamlessly by another user during an IM session. The other user is then able to type a response during the same IM session, thus making IM more seamless and instantaneous than e-mail and other types of computer-based communication.

While IM provides the advantage of immediate two-way communication, that same immediacy can also be a problem. That is, many people forget to pause or disable their IM program when they attend a meeting or otherwise do not want to be disturbed, such that any incoming instant messages would be received at an inopportune time (i.e., during a meeting). Such instant messages disrupt the flow of the meeting, particularly when the recipient of the message is the meeting chairperson. When these instant messages arrive, the recipient must either ignore the message (which may be considered rude), or the recipient must send a message to the sender explaining that the receiver is busy at present.

SUMMARY

In some example embodiments, there is a method of communicating a user's Instant Messaging (IM) availability status. The method includes associating a user-defined shortcut command with at least two different user-drafted status responses. In response to a user receiving a first instant message from a first sender at an inopportune time and the user then inputting the user-defined shortcut command, the method includes automatically transmitting a first user-draft status response of the at least two different user-drafted status responses to the first sender of the first instant message that was received at the inopportune time. In response to the user receiving a second message from a second sender at the inopportune time and the user then inputting the user-defined shortcut command, the method includes automatically transmitting a second user-draft status response of the at least two different user-drafted status responses to the second sender of the instant message that was received at the inopportune time. A relationship between the first sender and the user is different than a relationship between the second sender and the user.

DESCRIPTION OF EMBODIMENTS

Figure 1:
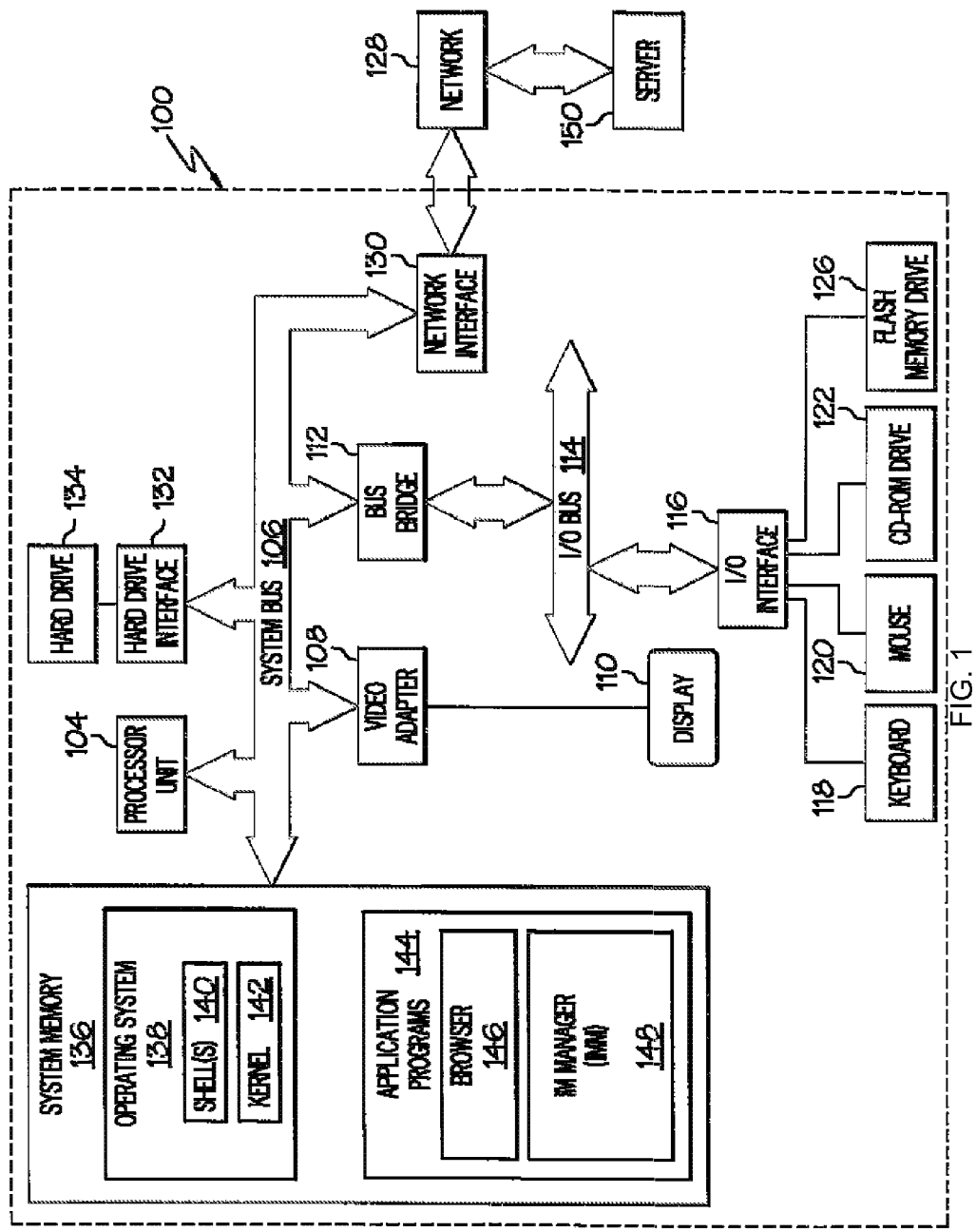
FIG. 1 depicts an exemplary computer in which the present invention may be implemented.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java® (Java is a registered trademark of Sun Microsytems, Inc. in the United States and other countries), Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatuses (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

With reference now to FIG. 1, there is depicted a block diagram of an exemplary computer 100, with which the present invention may be utilized. Computer 100 includes a processor unit 104 that is coupled to a system bus 106. A video adapter 108, which drives/supports a display 110, is also coupled to system bus 106. System bus 106 is coupled via a bus bridge 112 to an Input/Output (I/O) bus 114. An I/O interface 116 is coupled to I/O bus 114. I/O interface 116 affords communication with various I/O devices, including a keyboard 118, a mouse 120, a Compact Disk-Read Only Memory (CD-ROM) drive 122, and a flash memory drive 126. The format of the ports connected to I/O interface 116 may be any known to those skilled in the art of computer architecture, including but not limited to Universal Serial Bus (USB) ports.

Computer 100 is able to communicate with a server 150 via a network 128 using a network interface 130, which is coupled to system bus 106. Network 128 may be an external network such as the Internet, or an internal network such as an Ethernet or a Virtual Private Network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory 136 is defined as a lowest level of volatile memory in computer 100. This volatile memory may include additional higher levels of volatile memory (not shown), including, but not limited to, cache memory, registers, and buffers. Code that populates system memory 136 includes an operating system (OS) 138 and application programs 144.

OS 138 includes a shell 140, for providing transparent user access to resources such as application programs 144. Generally, shell 140 is a program that provides an interpreter and an interface between the user and the operating system. Shell 140 provides a system prompt, interprets commands entered by keyboard 118, mouse 120, or other user input media, and sends the interpreted command(s) to the appropriate lower levels of the operating system (e.g., kernel 142) for processing. As depicted, OS 138 also includes kernel 142, which includes lower levels of functionality for OS 138. Kernel 142 provides essential services required by other parts of OS 138 and application programs 144. The services provided by kernel 142 include memory management, process and task management, disk management, and I/O device management.

Application programs 144 include a browser 146. Browser 146 includes program modules and instructions enabling a World Wide Web (WWW) client (i.e., computer 100) to send and receive network messages to the Internet. Computer 100 may utilize HyperText Transfer Protocol (HTTP) messaging to enable communication with server 150. Application programs 144 in system memory 136 also include an Instant messaging Manager (IMM) 148. IMM 148 performs the functions of an Instant Messaging (IM) program, as well as the novel additional features described below in FIGS. 2-5.

The hardware elements depicted in computer 100 are not intended to be exhaustive, but rather represent and/or highlight certain components that may be utilized to practice the present invention. For instance, computer 100 may include alternate memory storage devices such as magnetic cassettes, Digital Versatile Disks (DVDs), Bernoulli cartridges, and the like. These and other variations are intended to be within the spirit and scope of the present invention.

Figure 2A:
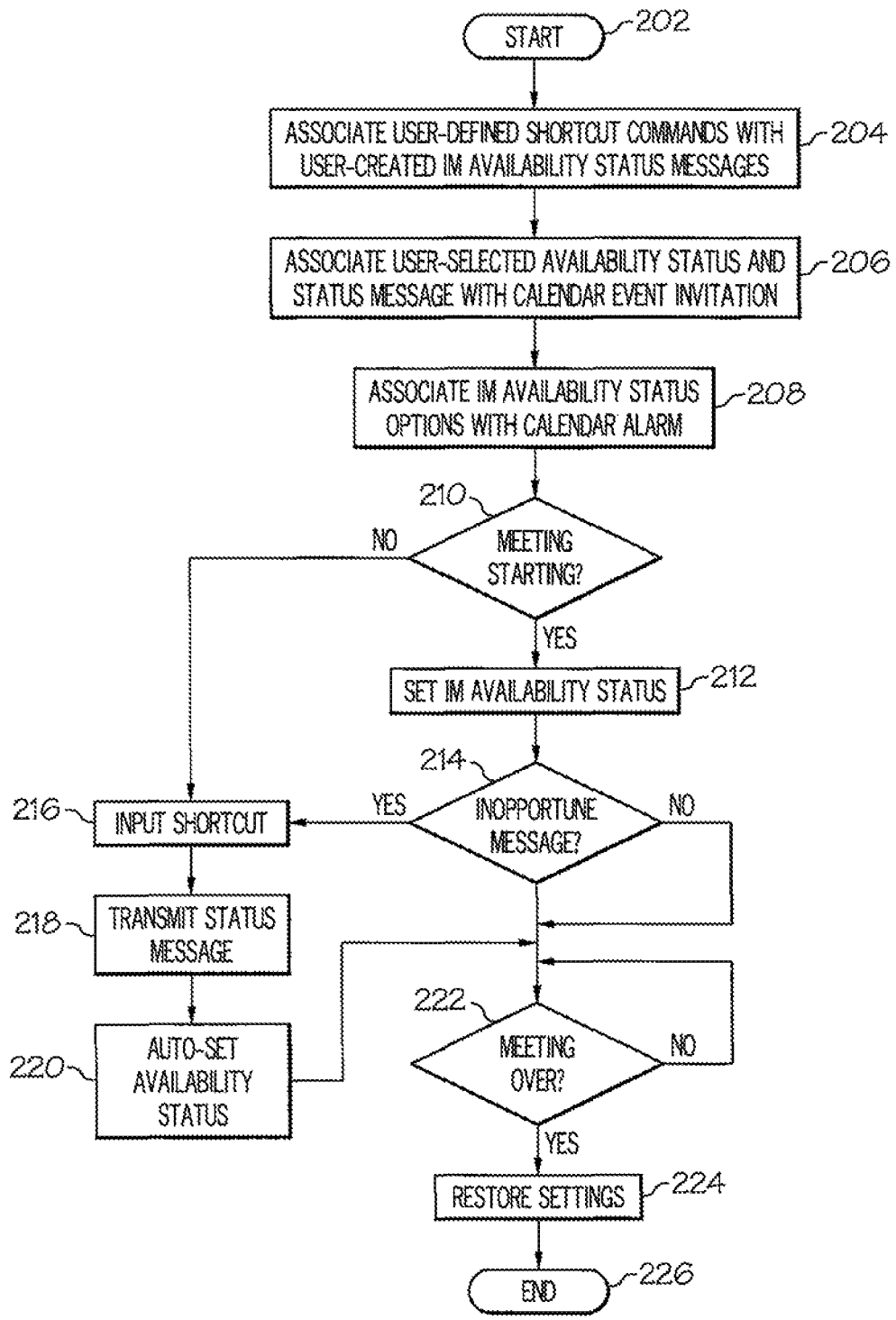
FIG. 2A is a high-level flow-chart of exemplary steps taken to allow a user to dynamically manage her IM status during a meeting.
Figure 2B:
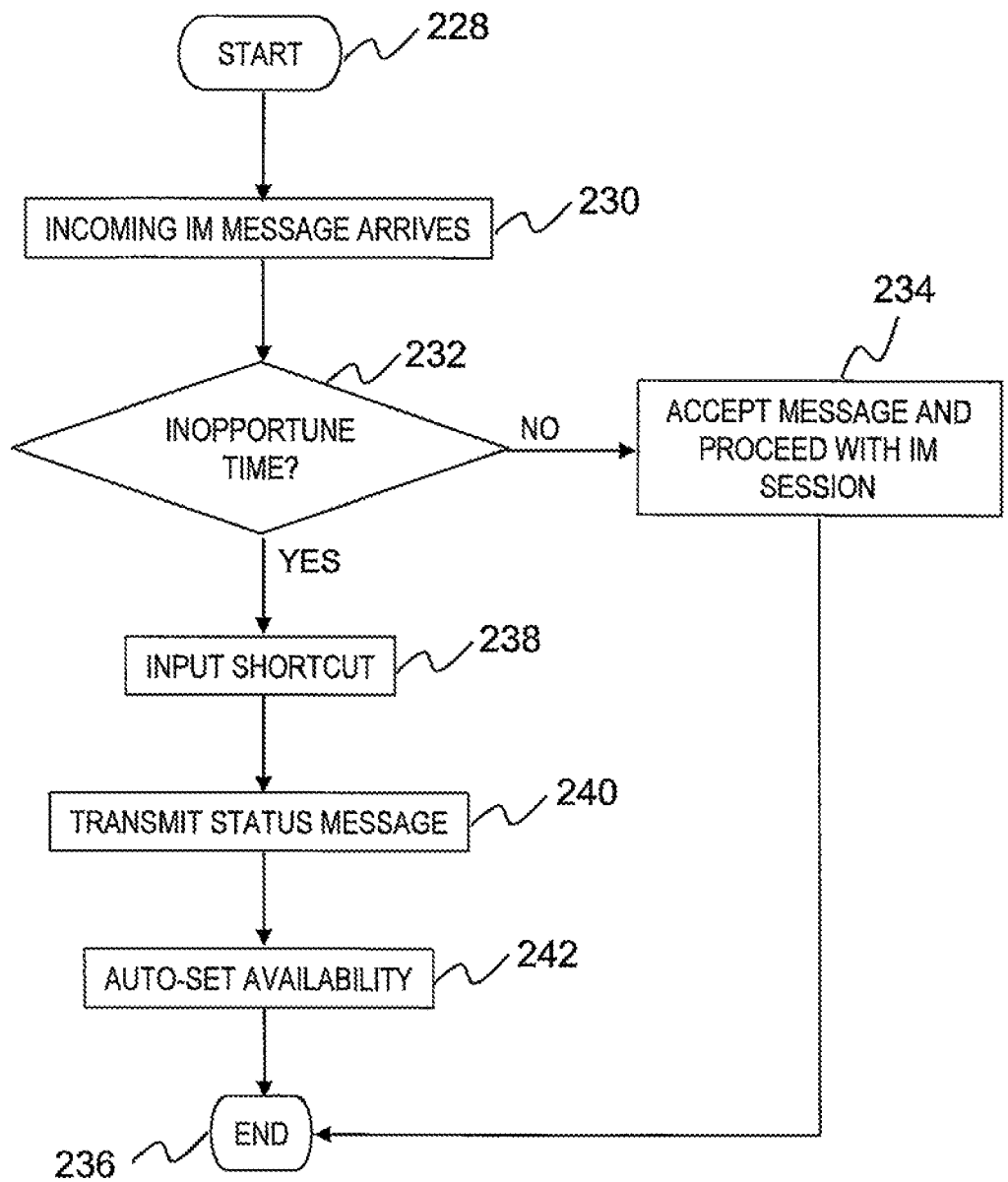
FIG. 2B is a high-level flow-chart of exemplary steps taken to allow a user to input a shortcut command to reject an incoming IM message that is received at any inopportune time.

Referring now to FIG. 2A, a high-level flow-chart of exemplary steps taken to communicate and manage a user's Instant Messaging (IM) availability status during a meeting is presented. After initiator block 202, which may be initiated by a user deciding to customize her IM availability status and/or status messages/responses, one or more user-defined shortcut commands are associated with a respective user-created IM status message (block 204). For example, "IAM" may be a shortcut command for a user-drafted status response of "In A Meeting." "DND" could be a shortcut command for a user-drafted status response of "Do Not Disturb." Note that both these exemplary user-defined shortcut commands and the user-created IM status messages are custom-created by the user, thus making the shortcut command logical to the user who created it.

As shown in block 206, in one embodiment a user-selected status and/or status message may be associated with a calendar event invitation. That is, when the user receives an invitation to a meeting (which is placed on a calendar that is managed by the computer), a particular user IM availability status is associated with that meeting. Various IM availability statuses may also be associated with a calendar alarm (block 208), such that the user can override a previously set IM availability status during the meeting.

When a meeting is starting, or about to start (query block 210), the IM availability status for a user is set (block 212). (Note that a "meeting" is utilized as an exemplary inopportune time for receiving an IM message. However, it is to be understood that the use of features described herein may be for any period of time chosen by the user, including her lunch hour, during high-focus work periods, etc.) Note also that even if a meeting is not about to start (query block 210), but the user wishes to auto-set status availability and messages, these steps (216, 218, 220) can be implemented in a manner described below.

Figure 3:
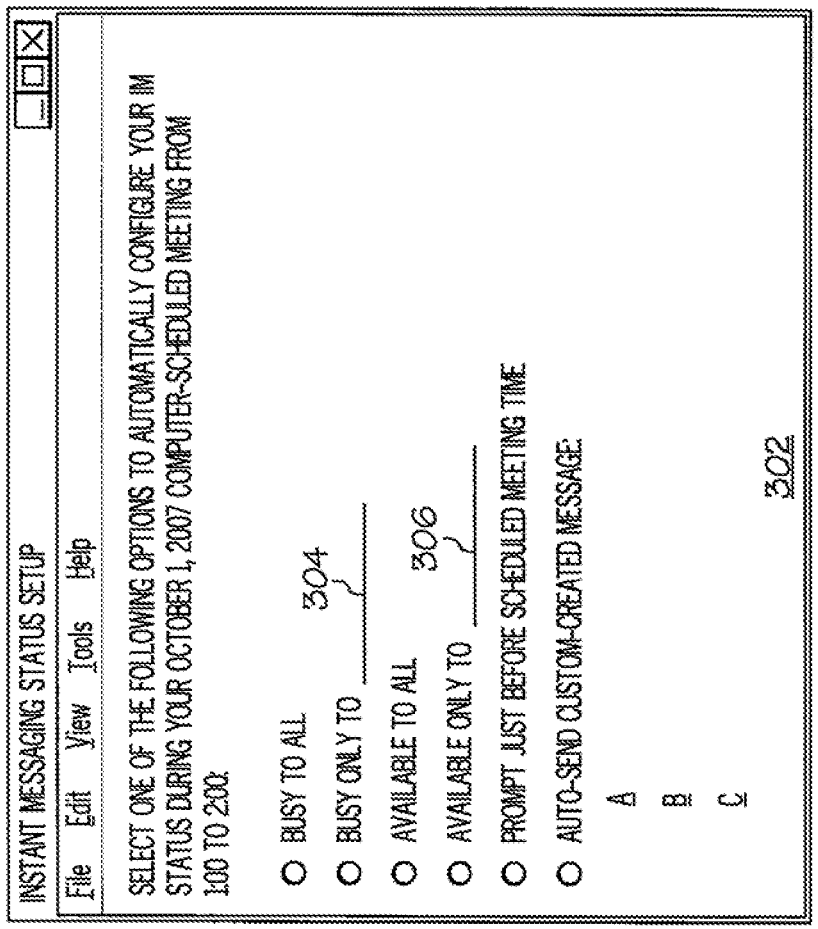
FIG. 3 depicts a GUI for setting user-defined IM statuses during meetings.

There are several ways that the IM availability status for the user can be set. In one embodiment, the user manually selects beforehand what her availability status will be during a meeting. Thus, as shown in FIG. 3, a user's IM status setup Graphical User Interface (GUI) 302 presents the user with instructions on how to set her availability status during a meeting that is to be held on Oct. 1, 2007 from 1:00 to 2:00. The user can declare her status as being unavailable to all messages ("Busy to all"), or she can be willing to receive messages from anyone during the meeting ("Available to all"). Alternatively, she can wait ("Prompt just before scheduled meeting time") to decide her status until just before the meeting, such as when a "Meeting Alarm" pops up on her computer. In one embodiment, the user is able to block certain message senders by inputting the IM name(s) of block senders in field 304. In one embodiment, certain message senders are allowed to send messages to the user according to which name(s) are entered in field 306. Note that one or more of the options shown in Setup GUI 302 may be selected and utilized at the same time for the same meeting period. Note also that the user can select one of multiple user-drafted auto-replies (A, B or C) to selected senders.

Returning to block 212 of FIG. 2A, another manner for setting the IM availability status is to auto-set it when a user accepts an invitation to the meeting. The IM availability status may be a default setting, or it may be a user-created availability status, which may be accompanied by an auto-reply created by the user for use during the meeting. In another embodiment, the user's availability status is mandated by a leader of the meeting, who has the power to override any availability status that the user may have created for himself.

Figure 4:
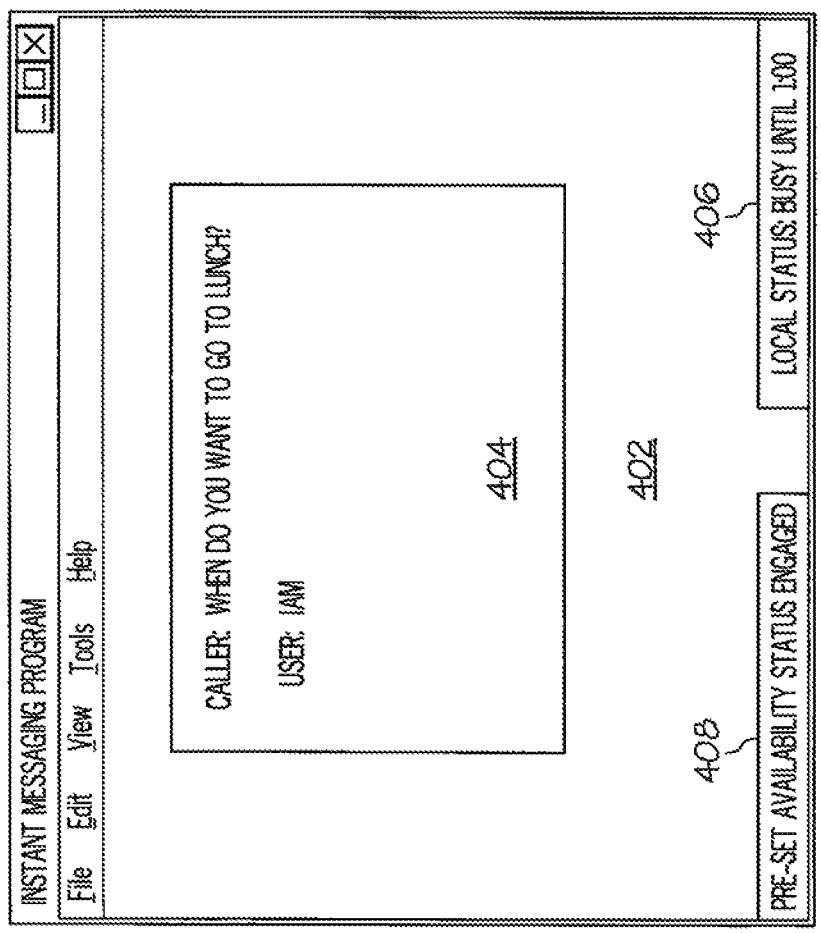
FIGS. 4-5 illustrate Graphical User Interfaces (GUIs) that utilize a user-created shortcut for an IM status profile and message.
Figure 5:
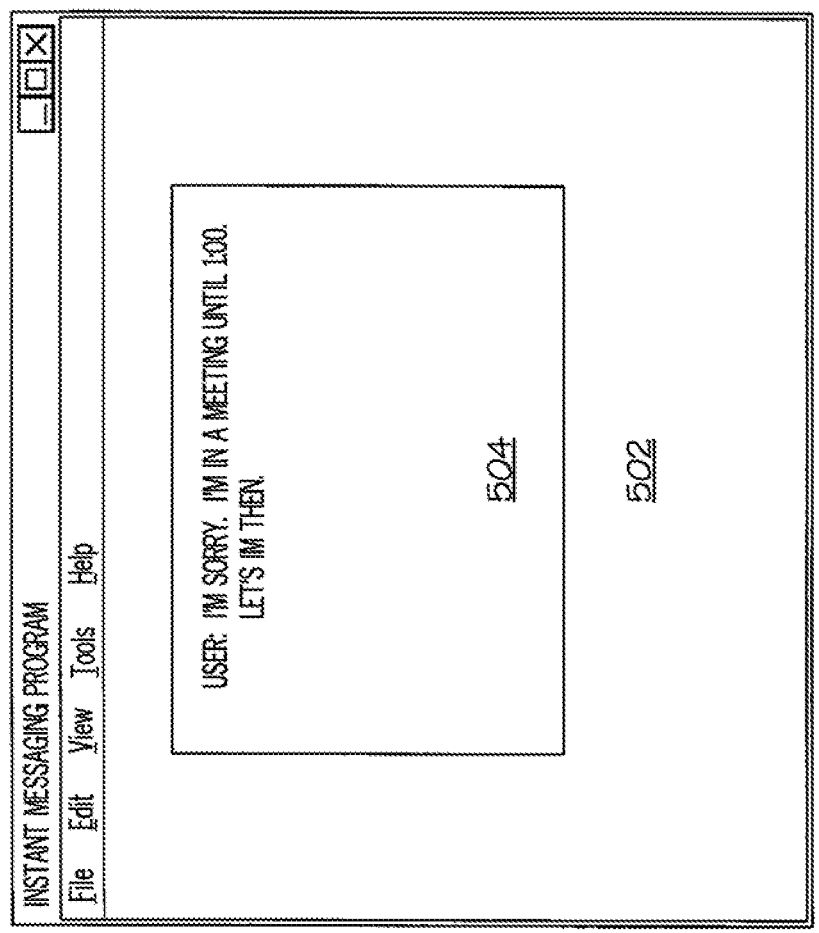

Another method for creating an IM availability status and/or availability status message can occur after a message is received at an inopportune time (query block 214). If the user receives an IM message at an inopportune time, then the user can input a user-defined shortcut command (block 216), preferably into the IM session box. This results in a user-drafted status response being sent to the message sender (block 218), and the IM availability status for the receiving user being (optionally) auto-set (block 220). Thus, as shown in FIG. 4, a user's IM GUI 402 includes an IM session box 404, in which instant messages are received and typed (for transmission to another IM user). Assume that the local user received a message from Caller asking "When to you want to go to lunch?" Rather than sending a detailed response message, the local user simply types in "IAM." This results in the caller receiving a user-drafted lengthy message, which has been pre-associated with the user-defined shortcut command "IAM." This lengthy message ("I'm sorry. I'm in a meeting until 1:00. Let's IM then.") appears in the IM window 504 of Caller's IM GUI 502, as shown in FIG. 5. Note that the message is populated with the "1:00" time by the computer-scheduled meeting. That is, when the local user accepted the invitation (and/or is currently attending the meeting), her local calendar "knows" that she is in a meeting until 1:00, and thus provides this information to the IMM 148 shown in FIG. 1. Note that this information is also shown in a meeting time window 406 shown in FIG. 4. Note also that a status window 408 indicates that the pre-set availability status has been engaged by typing in the message "IAM." In one embodiment, status window 408 is an active button that, when clicked, will manually engage whatever availability status has been assigned by the user for the meeting time.

Returning to FIG. 2A, the availability settings and auto-replies for the user remain in effect until the meeting is over (query block 222). At that point, the availability status and status messages (if any) are restored (block 224) to their conditions as they were before the meeting started (or at any other period before their change). These conditions can be automatically restored upon the meeting ending, or they can be restored using another input, either user-defined or default, to the computer instructing the message status and/or messages to be restored to their original condition. The process ends (terminator block 226).

Note that while the present invention has been described in the context of a user not wanting to be disturbed by messages received at an inopportune time (e.g., during a meeting), the presently described invention (utilizing user-defined shortcuts) may be utilized even when messages are welcomed. That is, a "Do not disturb" message may be replaced by a user-defined shortcut that instructs her computer to start accepting new messages. For example, consider the scenario described in FIG. 2B. After initiator block 228, an incoming IM message may arrive at a user's computer (block 230). If it is an opportune time for the user to engage in an IM session (query block 232), then the message is accepted and the IM session proceeds (block 234), thus ending the process (terminator block 236). However, if the IM message has arrived at an inopportune time (query block 232), then the receiving user may input a user-defined shortcut (block 238) as described above (e.g., "IAM" to send the message "In A Meeting"). Thus, the status message "In A Meeting" is sent to the original IM message sender (block 240). By inputting the "IAM" shortcut, the availability status of the receiver of the original IM message is also auto-set (block 242), such that any future IM messages from non-exempted senders (i.e., senders that have been pre-authorized by the receiver to override the availability message and message blocker) are blocked, and the "In A Meeting" is auto-transmitted back to the IM sender.

As described herein, the present invention presents many novel features, including the following:

1. User-Defined Shortcuts

The system described herein provides an interface that allows a user to set a predefined abbreviation or acronym and its associated personalized message. For example, sending "IAM" could be set up to a) change the IM status to "in a meeting." A user can also configure a canned, personalized message that is associated to the "IAM" status, such as "Sorry, can't talk right now, in a meeting—will get back to you ASAP". In another example, sending "DND" could change the IM status to 'Do Not Disturb." The canned message could be set up to vary based on the recipient, such that a manager might get a very different message than a peer of the user. Optionally, the user can choose to broadcast the canned message to all active chat session recipients, with the additional nuance of the sender being able to specify that the message should or should not result in the recipient's session window being shown at the top of the z-order.

2. Pre-Meeting Availability Setup

When a calendar alarm panel pops up before a meeting or other scheduled time period, the alarm may contain a special button that sets the user's IM status automatically to the user's preferred IM status during the start and end time of the meeting, even if the user's laptop may travel from the office to the conference after pressing the button. For example, if a user prefers to configure the associated IM status to "In A Meeting," when the user presses this button, the user's IM status will be set to "In A Meeting" between the start and end time of the meeting whenever the user is not offline during that period. The modified status may expire after the end of the meeting, or whenever the user chooses to change the IM status manually.

3. Availability Setup at Meeting Invitation Time

When a user accepts an invitation, the mail client can give the user the option to set the user's IM status automatically to the user's preferred IM status between the start and end time of the meeting. When an alarm is used before the meeting, the settings could be overwritten if desired when an alarm goes off before the meeting, such that the user can also set the IM status from the alarm.

4. Meeting Moderator Override

When the meeting originator/owner sends out the calendar event invitation, the mail client can also set the user's IM status automatically to the user's preferred IM status during the start and end time of the meeting if desired, such that the default is set to what the owner desires. That is, the meeting owner sets the chat status both for his IM session as well as the invitees' IM session (which may be different), and thus the invitee is forced to use the IM availability status that is dictated by the meeting originator/owner. Optionally, the invitee can then change from the default if desired. Furthermore, in one embodiment, the meeting originator/owner has the power to specify that certain recipients are unable to modify the availability setting that has been dictated to the user.

Note that the flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A method of communicating a user's Instant Messaging (IM) availability status, the method comprising:
   associating a user-defined shortcut command with at least two different user-drafted status responses;
   in response to a user receiving a first instant message from a first sender at an inopportune time and the user then inputting the user-defined shortcut command, automatically transmitting a first user-draft status response of the at least two different user-drafted status responses to the first sender of the first instant message that was received at the inopportune time; and
   in response to the user receiving a second message from a second sender at the inopportune time and the user then inputting the user-defined shortcut command, automatically transmitting a second user-draft status response of the at least two different user-drafted status responses to the second sender of the instant message that was received at the inopportune time, wherein a relationship between the first sender and the user are different than a relationship between the second sender and the user, wherein the first user-draft status response defines the user's IM availability status defined based on the relationship between the user and the first sender, wherein the second user-draft status response defines the user's IM availability status defined based on the relationship between the user and the second sender.

2. The method of claim 1, further comprising:
   associating the user-defined shortcut command with a user's IM availability status; and
   in response to the user inputting the user-defined shortcut command, automatically setting the user's IM availability status in accordance with the user-defined shortcut command that has been input by the user.

3. The method of claim 1, wherein the inopportune time is during a computer-scheduled meeting.

4. The method of claim 3, further comprising:
   presenting a status change option to the user before the computer-scheduled meeting, wherein the status change option enables the user to manually override the user's IM availability status that was associated with the user-defined shortcut command.

5. The method of claim 3, wherein the user's IM status is automatically restored to an available status condition when the computer-scheduled meeting is over, wherein the available status condition permits the user to receive instant messages.

6. The method of claim 3, further comprising:
   receiving a meeting manager's override option selection, wherein the manager's override option selection overrides the first user-drafted response and the second user-drafted response in order to impose an override IM availability status for the user, wherein the override IM availability status is different from the first user-drafted response and the second user-drafted response.

7. The method of claim 1, wherein the user-defined shortcut command is only available to generate user-drafted status responses to one or more specified instant message senders.

8. A method for managing a user's Instant Messaging (IM) availability status, the method comprising:
presenting a plurality of options to a user before a computer-scheduled meeting, wherein each of the plurality of options describes a different availability status for the user;
receiving a user's selection of a first option of the plurality of options for sending to a first sender of a first instant message received during the computer-scheduled meeting, wherein the first option includes a first availability status for the user that includes a first user-drafted status response;
receiving a user's selection of a second option of the plurality of options for sending to a second sender of a second instant message received during the computer-scheduled meeting, wherein the second option includes a second availability status for the user that includes a second user-drafted status response; and
applying the user's selection of the first option and the second option for a length of the computer-scheduled meeting in response to receiving the first instant message from the first sender and in response to receiving the second instant message from the second sender.

9. The method of claim 8, wherein the plurality of options is presented to the user contemporaneously with an alarm notice that the computer-scheduled meeting is imminent.

10. The method of claim 8, wherein the plurality of options are presented to the user when the user accepts an invitation to the computer-scheduled meeting.

11. The method of claim 8, further comprising:
receiving a meeting manager's override option selection, wherein the manager's override option selection overrides the first option and the second option in order to impose an override IM availability status for the user, wherein the override IM availability status is different from the first option and the second option that was selected by the user.

12. A computer program product for communicating a user's Instant Messaging (IM) availability status, the computer program product comprising:
a non-transitory computer readable storage medium having computer usable program code embodied therewith, the computer usable program code comprising a computer usable program code configured to:
associate a user-defined shortcut command with at least two different user-drafted status responses;
in response to a user receiving a first instant message from a first sender at an inopportune time and the user then inputting the user-defined shortcut command, automatically transmit a first user-draft status response of the at least two different user-drafted status responses to the first sender of the first instant message that was received at the inopportune time; and
in response to the user receiving a second message from a second sender at the inopportune time and the user then inputting the user-defined shortcut command, automatically transmit a second user-draft status response of the at least two different user-drafted status responses to the second sender of the instant message that was received at the inopportune time, wherein a relationship between the first sender and the user are different than a relationship between the second sender and the user, wherein the first user-draft status response defines the user's IM availability status defined based on the relationship between the user and the first sender, wherein the second user-draft status response defines the user's IM availability status defined based on the relationship between the user and the second sender.

13. The computer program product of claim 12, wherein the computer usable program code is configured to:
associate the user-defined shortcut command with a user's IM availability status; and
in response to the user inputting the user-defined shortcut command, automatically set the user's IM availability status in accordance with the user-defined shortcut command that has been input by the user.

14. The computer program product of claim 12, wherein the inopportune time is during a computer-scheduled meeting.

15. The computer program product of claim 14, wherein the computer usable program code is configured to:
present a status change option to the user before the computer-scheduled meeting, wherein the status change option enables the user to manually override the user's IM availability status that was associated with the user-defined shortcut command.

16. The computer program product of claim 14, wherein the user's IM status is automatically restored to an available status condition when the computer-scheduled meeting is over, wherein the available status condition permits the user to receive instant messages.

17. The computer program product of claim 12, wherein the user-defined shortcut command is only available to generate user-drafted status responses to one or more specified instant message senders.

18. A computer program product for communicating a user's Instant Messaging (IM) availability status, the computer program product comprising:
a non-transitory computer readable storage medium having computer usable program code embodied therewith, the computer usable program code comprising a computer usable program code configured to:
presenting a plurality of options to a user before a computer-scheduled meeting, wherein each of the plurality of options describes a different availability status for the user;
receiving a user's selection of a first option of the plurality of options for sending to a first sender of a first instant message received during the computer-scheduled meeting, wherein the first option includes a first availability status for the user that includes a first user-drafted status response;
receiving a user's selection of a second option of the plurality of options for sending to a second sender of a second instant message received during the computer-scheduled meeting, wherein the second option includes a second availability status for the user that includes a second user-drafted status response; and
applying the user's selection of the first option and the second option for a length of the computer-scheduled meeting in response to receiving the first instant message from the first sender and in response to receiving the second instant message from the second sender.

19. The computer program product of claim 18, wherein the plurality of options is presented to the user contemporaneously with an alarm notice that the computer-scheduled meeting is imminent.

20. The computer program product of claim 18, wherein the plurality of options are presented to the user when the user accepts an invitation to the computer-scheduled meeting.

21. The computer program product of claim 18, wherein the computer usable program code is configured to:
 receive a meeting manager's override option selection, wherein the manager's override option selection overrides the first option and the second option in order to impose an override IM availability status for the user, wherein the override IM availability status is different from the first option and the second option that was selected by the user.

22. An apparatus comprising:
 a processor; and
 an instant messaging manager configured to communicate a user's Instant Messaging (IM) availability status and operable on the processor, the instant messaging manager configured to,
 associate a user-defined shortcut command with at least two different user-drafted status responses;
 in response to a user receiving a first instant message from a first sender at an inopportune time and the user then inputting the user-defined shortcut command, automatically transmit a first user-draft status response of the at least two different user-drafted status responses to the first sender of the first instant message that was received at the inopportune time; and
 in response to the user receiving a second message from a second sender at the inopportune time and the user then inputting the user-defined shortcut command, automatically transmit a second user-draft status response of the at least two different user-drafted status responses to the second sender of the instant message that was received at the inopportune time, wherein a relationship between the first sender and the user are different than a relationship between the second sender and the user, wherein the first user-draft status response defines the user's IM availability status defined based on the relationship between the user and the first sender, wherein the second user-draft status response defines the user's IM availability status defined based on the relationship between the user and the second sender.

23. The apparatus of claim 22, wherein the instant messaging manager is configured to:
 associate the user-defined shortcut command with a user's IM availability status; and
 in response to the user inputting the user-defined shortcut command, automatically set the user's IM availability status in accordance with the user-defined shortcut command that has been input by the user.

24. The apparatus of claim 22, wherein the inopportune time is during a computer-scheduled meeting.

25. The apparatus of claim 24, wherein the instant messaging manager is configured to:
 receive a meeting manager's override option selection, wherein the manager's override option selection overrides the first user-drafted response and the second user-drafted response in order to impose an override IM availability status for the user, wherein the override IM availability status is different from the first user-drafted response and the second user-drafted response.

\* \* \* \* \*